US012308527B2

(12) United States Patent
Wang et al.

(10) Patent No.: US 12,308,527 B2
(45) Date of Patent: May 20, 2025

(54) ANTENNA AND MANUFACTURING METHOD THEREOF

(71) Applicants: Beijing BOE Sensor Technology Co., Ltd., Beijing (CN); BOE TECHNOLOGY GROUP CO., LTD., Beijing (CN)

(72) Inventors: Ying Wang, Beijing (CN); Tienlun Ting, Beijing (CN); Jie Wu, Beijing (CN); Haocheng Jia, Beijing (CN); Liang Li, Beijing (CN); Cuiwei Tang, Beijing (CN); Qiangqiang Li, Beijing (CN); Wei Zhang, Beijing (CN); Chuncheng Che, Beijing (CN); Hao Liu, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 965 days.

(21) Appl. No.: 17/332,785

(22) Filed: May 27, 2021

(65) Prior Publication Data

US 2022/0102873 A1 Mar. 31, 2022

(30) Foreign Application Priority Data

Sep. 29, 2020 (CN) ......................... 202011050240.4

(51) Int. Cl.
*H01Q 21/06* (2006.01)
*H01Q 9/04* (2006.01)
*H01Q 21/00* (2006.01)

(52) U.S. Cl.
CPC ......... *H01Q 21/065* (2013.01); *H01Q 9/0457* (2013.01); *H01Q 21/0075* (2013.01); *H01Q 21/0087* (2013.01)

(58) Field of Classification Search
CPC ............................................ H01Q 21/0006–30
See application file for complete search history.

(56) References Cited

U.S. PATENT DOCUMENTS 3,218,580 A 11/1965 Zanichkowsky
4,429,313 A * 1/1984 Muhs, Jr. ............. H01Q 21/005 343/771

(Continued)

FOREIGN PATENT DOCUMENTS

CN 106505289 A 3/2017
CN 107394417 A * 11/2017 .............. H01Q 1/50

(Continued)

OTHER PUBLICATIONS

CN-107394417 (Year: 2017).*

(Continued)

*Primary Examiner* — Ab Salam Alkassim, Jr.
(74) *Attorney, Agent, or Firm* — HOUTTEMAN LAW LLC

(57) ABSTRACT

An antenna and a method for manufacturing the same are provided. The antenna includes a first substrate, a second substrate opposite to the first substrate, a plurality of radiation units on a side of the first substrate distal to the second substrate, and a waveguide power division structure between the first substrate and the second substrate. The waveguide power division structure has a waveguide cavity, includes an input opening and a plurality of output openings, and divides a signal input through the input opening into a plurality of sub-signals. The plurality of sub-signals are output from the plurality of output openings, respectively, and each of the plurality of output openings outputs one of the plurality of sub-signals to at least one of the plurality of radiation units.

19 Claims, 9 Drawing Sheets

(56) References Cited

U.S. PATENT DOCUMENTS 4,821,044 A * 4/1989 Kurtz .................... H01Q 21/005 343/771
5,270,721 A * 12/1993 Tsukamoto ............ H01Q 21/24 343/770
6,034,647 A * 3/2000 Paul ...................... H01Q 21/061 343/778
6,285,335 B1 * 9/2001 Snygg ................ H01Q 21/0087 343/770
6,563,398 B1 * 5/2003 Wu .................... H01Q 21/0037 333/137
9,899,722 B2 * 2/2018 Saraf ..................... H01Q 21/064
10,236,587 B2 * 3/2019 Kim ...................... H01Q 13/106
10,431,902 B2 * 10/2019 You ....................... H01Q 21/064
10,741,917 B2 * 8/2020 Pelletti ............... H01Q 15/0086
11,450,972 B2 * 9/2022 Wang ................. H01Q 21/0075
11,670,852 B2 * 6/2023 Lei ........................... H01Q 3/36 343/853
2004/0080463 A1 * 4/2004 Jeong ................... H01Q 21/005 343/770
2009/0066597 A1 * 3/2009 Yang ....................... H01P 3/121 343/771
2013/0120205 A1 * 5/2013 Thomson ............. H01Q 21/064 29/600
2013/0120206 A1 * 5/2013 Biancotto ............ H01Q 21/005 29/600
2014/0266897 A1 * 9/2014 Jakoby ..................... H01Q 3/44 29/601
2015/0188236 A1 * 7/2015 Oppenlaender ........ H01Q 15/24 343/893
2015/0318618 A1 * 11/2015 Chen ....................... H01P 7/082 343/750
2016/0020522 A1 * 1/2016 Sano ......................... H01P 3/12 343/767
2016/0036131 A1 * 2/2016 Kim ..................... H01Q 1/3233 343/771
2016/0047893 A1 * 2/2016 Izadian ................ H04B 7/0617 342/368
2016/0301143 A1 * 10/2016 Cao ........................... H01P 5/12
2017/0244173 A1 * 8/2017 Moon .................. H01Q 13/106
2017/0271776 A1 * 9/2017 Biancotto ............ H01Q 21/064
2018/0062272 A1 * 3/2018 Haziza ............... H01Q 21/0087
2018/0358709 A1 * 12/2018 You ...................... H01Q 21/064
2019/0379132 A1 * 12/2019 Pelletti ................. H01Q 9/0457
2020/0014116 A1 * 1/2020 You ........................ H01Q 13/18
2020/0388934 A1 * 12/2020 Misaki ..................... H01Q 3/44
2022/0115780 A1 * 4/2022 Wang ....................... H01Q 3/36
2023/0098813 A1 * 3/2023 Fang ........................ H01Q 3/36 342/372
2023/0155266 A1 * 5/2023 Fang ....................... H01P 1/181 343/850
2024/0235020 A1 * 7/2024 Fang ....................... H01P 3/003
2024/0250434 A1 * 7/2024 Wang ....................... H01Q 1/38
2024/0364012 A1 * 10/2024 Wang ....................... H01Q 1/02

FOREIGN PATENT DOCUMENTS

CN 108123220 A 6/2018
CN 108808220 A 11/2018
CN 209913001 U 1/2020
CN 111244619 A * 6/2020
CN 211126067 U 7/2020
CN 212323214 U 1/2021

OTHER PUBLICATIONS

CN-111244619 (Year: 2020).*
China Patent Office, First Office Action issued Mar. 7, 2023 for application No. CN202011050240.4.

* cited by examiner

ANTENNA AND MANUFACTURING METHOD THEREOF

CROSS REFERENCE TO RELATED APPLICATIONS

The present application claims the priority of Chinese patent application No. 202011050240.4, filed on Sep. 29, 2020, the content of which is incorporated herein by reference in its entirety.

TECHNICAL FIELD

The present disclosure relates to the field of antenna technologies, and in particular to an antenna and a method for manufacturing an antenna.

BACKGROUND

An antenna device generally adopts a power division structure to divide an input signal into a plurality of sub-signals and output the plurality of sub-signals to a plurality of radiation units, respectively, and each of the radiation units sends out a received sub-signal. In the related art, the power division structure usually adopts a microstrip (which may also be referred to as a microstrip line) for transmitting a signal. However, an insertion loss of the microstrip is large, which causes a large signal loss.

SUMMARY

Some embodiments of the present disclosure provide an antenna and a method for manufacturing an antenna.

A first aspect of the present disclosure provides an antenna, which includes:

a first substrate;

a second substrate opposite to the first substrate;

a plurality of radiation units on a side of the first substrate distal to the second substrate; and a waveguide power division structure between the first substrate and the second substrate, wherein the waveguide power division structure has a waveguide cavity, includes an input opening and a plurality of output openings, and divides a signal input through the input opening into a plurality of sub-signals, the plurality of sub-signals are output from the plurality of output openings, respectively, and each of the plurality of output openings outputs one of the plurality of sub-signals to at least one of the plurality of radiation units.

In an embodiment, the antenna further includes:

a first conductive layer on a side of the first substrate proximal to the second substrate;

a first electrode on a side of the second substrate proximal to the first substrate; and a support wall surrounding the first electrode, and a second conductive layer on an inner side of the support wall, wherein the second conductive layer, the first electrode, and a portion of the first conductive layer corresponding to the first electrode are connected to each other to form the waveguide cavity.

In an embodiment, the first electrode has a plurality of ends corresponding to the input opening and the plurality of output openings;

the support wall includes first portions and second portions, the first portions are portions of the support wall corresponding to the plurality of ends, and the remaining portions of the support wall are the second portions; and the first portion are on a side of the first electrode proximal to the first substrate, the second portions are on the side of the second substrate proximal to the first substrate, and the second conductive layer is only on inner sides of the second portions.

In an embodiment, the first electrode is a T-shaped electrode, and the support wall is around the T-shaped electrode;

the second conductive layer, the T-shaped electrode, and a portion of the first conductive layer corresponding to the T-shaped electrode are connected to each other to form a T-shaped waveguide cavity;

the plurality of output openings are two output openings; and the T-shaped waveguide cavity has a first cavity and a second cavity, an extension direction of the first cavity and an extension direction of the second cavity are perpendicular to each other, two ends of the first cavity are the two output openings, one end of the second cavity is connected to a middle portion of the first cavity and communicates with the first cavity, and the other end of the second cavity is the input opening.

In an embodiment, the antenna further includes: a plurality of transmission structures in one-to-one correspondence with the plurality of radiation units and on a side of the second substrate proximal to the first substrate, each of the plurality of transmission structures is connected to one of the plurality of output openings, and each transmission structure transmits the sub-signal output from the output opening connected with the transmission structure to the radiation unit corresponding to the transmission structure.

In an embodiment, each transmission structure is a microstrip, of which one end is connected to the output opening corresponding to the transmission structure, and the other end is connected to the radiation unit corresponding to the transmission structure.

In an embodiment, the antenna further includes: an impedance matching structure on the side of the second substrate proximal to the first substrate, connected between each transmission structure and the output opening corresponding to the transmission structure, and configured to match an impedance of the transmission structure to an impedance of the waveguide power division structure.

In an embodiment, the impedance matching structure is a trapezoid electrode, a longer side of two parallel sides of the trapezoid electrode is connected to the output opening, and a shorter side of the two parallel sides of the trapezoid electrode is connected to the transmission structure corresponding to the output opening.

In an embodiment, the antenna further includes: a first conductive layer on a side of the first substrate proximal to the second substrate; and a plurality of second electrodes in one-to-one correspondence with the plurality of radiation units and on a side of the second substrate proximal to the first substrate, and each of the plurality of second electrodes is connected to one of the plurality of output openings, wherein the first conductive layer has a plurality of slits therein, the plurality of second electrodes are in one-to-one correspondence with the plurality of slits, an orthographic projection of each slit on the second substrate and an orthographic projection of the second electrode corresponding to the slit on the second substrate have an overlapping area, and each second electrode transmits the sub-signal output from the output opening connected with the second electrode to a corresponding radiation unit through a corresponding slit.

In an embodiment, the antenna further includes: a plurality of transmission structures in one-to-one correspondence with the plurality of radiation units and on the side of the second substrate proximal to the first substrate, each of the plurality of transmission structures is connected to one of the plurality of output openings, and each transmission structure is connected to a corresponding second electrode so as to transmit the sub-signal transmitted from the output opening connected with the transmission structure to the corresponding second electrode.

In an embodiment, the antenna further includes: a dielectric layer between the first substrate and the second substrate, and a dielectric constant of the dielectric layer is changed as a strength of an electric field between the first substrate and the second substrate is changed.

In an embodiment, the dielectric layer includes liquid crystal molecules outside the waveguide cavity, and the waveguide cavity is filled with air.

In an embodiment, each of the second conductive layer, the first electrode, and the portion of the first conductive layer corresponding to the first electrode has a thickness greater than 3 to 5 times a skin depth of the signal to be transmitted by the antenna.

In an embodiment, the antenna further includes: a plurality of transmission structures in one-to-one correspondence with the plurality of radiation units and on the side of the second substrate proximal to the first substrate, each of the plurality of transmission structures is connected to one of the plurality of output openings, and each transmission structure transmits the sub-signal output from the output opening connected with the transmission structure to the radiation unit corresponding to the transmission structure.

In an embodiment, the antenna further includes: an impedance matching structure on the side of the second substrate proximal to the first substrate, connected between each transmission structure and the output opening corresponding to the transmission structure, and configured to match an impedance of the transmission structure to an impedance of the waveguide power division structure.

In an embodiment, the impedance matching structure is a trapezoid electrode, a longer side of two parallel sides of the trapezoid electrode is connected to the output opening, and a shorter side of the two parallel sides of the trapezoid electrode is connected to the transmission structure corresponding to the output opening.

In an embodiment, the antenna further includes: a plurality of second electrodes in one-to-one correspondence with the plurality of radiation units and on the side of the second substrate proximal to the first substrate, and each of the plurality of second electrodes is connected to one of the plurality of output openings, wherein the first conductive layer has a plurality of slits therein, the plurality of second electrodes are in one-to-one correspondence with the plurality of slits, an orthographic projection of each slit on the second substrate and an orthographic projection of the second electrode corresponding to the slit on the second substrate have an overlapping area, and each second electrode transmits the sub-signal output from the output opening connected with the second electrode to a corresponding radiation unit through a corresponding slit.

In an embodiment, the first electrode, each of the second electrodes, each of the transmission structures, and the impedance matching structure are in a same layer, have a one-piece structure, and include a same conductive material.

A second aspect of the present disclosure provides a method for manufacturing an antenna, the method including:

forming a first substrate;

forming a second substrate, and arranging the second substrate opposite to the first substrate;

forming a plurality of radiation units on a side of the first substrate distal to the second substrate; and forming a waveguide power division structure between the first substrate and the second substrate, wherein the waveguide power division structure has a waveguide cavity, includes an input opening and a plurality of output openings, and divides a signal input through the input opening into a plurality of sub-signals, the plurality of sub-signals are output from the plurality of output openings, respectively, and each of the plurality of output openings outputs one of the plurality of sub-signals to at least one of the plurality of radiation units.

In an embodiment, the forming a waveguide power division structure includes:

forming a first conductive layer on a side of the first substrate proximal to the second substrate;

forming a first electrode on a side of the second substrate proximal to the first substrate; and forming a support wall around the first electrode and forming a second conductive layer on an inner side of the support wall, wherein the second conductive layer, the first electrode, and a portion of the first conductive layer corresponding to the first electrode are connected to each other to form the waveguide cavity, and wherein the forming a support wall around the first electrode and forming a second conductive layer on an inner side of the support wall includes:

coating a material of the support wall on the side of the second substrate proximal to the first substrate to form a support wall material layer, wherein the support wall material layer covers a side of the first electrode distal to the second substrate;

patterning the support wall material layer to form the support wall surrounding the first electrode; and forming the second conductive layer on the inner side of the support wall by a metal growth process.

DETAILED DESCRIPTION

Figure 1:
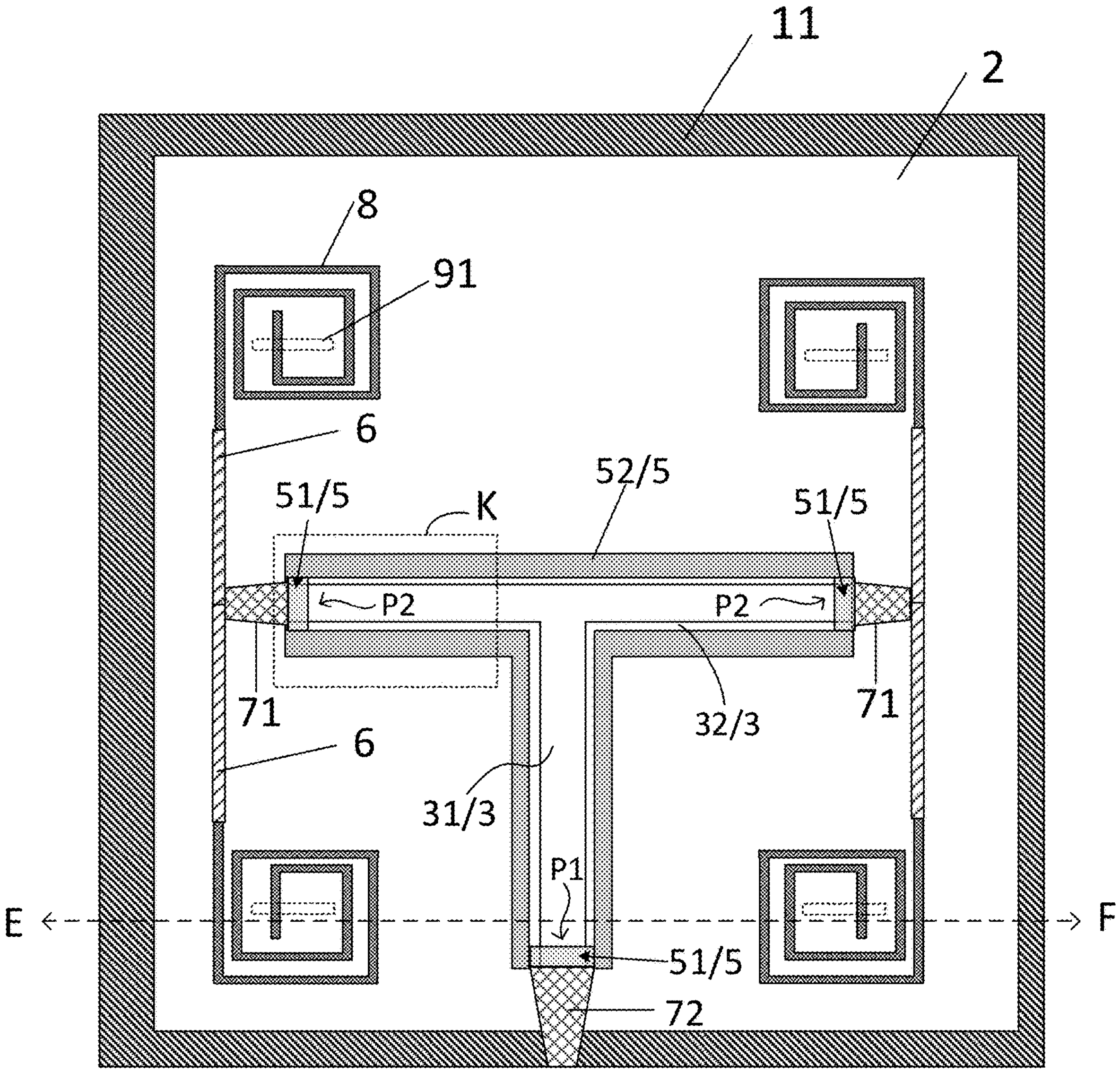
FIG. 1 is a schematic top view of an antenna according to an embodiment of the present disclosure.

To enable one of ordinary skill in the art to better understand technical solutions of the present disclosure, the present disclosure will be further described below in detail with reference to the accompanying drawings and exemplary embodiments.

The shapes and sizes of the components shown in the drawings are not necessarily drawn to scale, but are merely for the purpose of facilitating ease understanding of the contents of the present embodiments of the present disclosure.

Unless defined otherwise, technical or scientific terms used herein should have the same meaning as commonly understood by one of ordinary skill in the art to which the present disclosure belongs. The terms of "first" "second", and the like used in the present disclosure are not intended to indicate any order, quantity, or importance, but rather are used for distinguishing one element from another. Further, the term "a", "an", "the", or the like does not denote a limitation of quantity, but rather denote the presence of at least one element. The term of "comprising", "including", or the like, means that the element or item preceding the term contains the element or item listed after the term and the equivalent thereof, but does not exclude the presence of other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of the object being described is changed, the relative positional relationships may also be changed accordingly.

Figure 2:
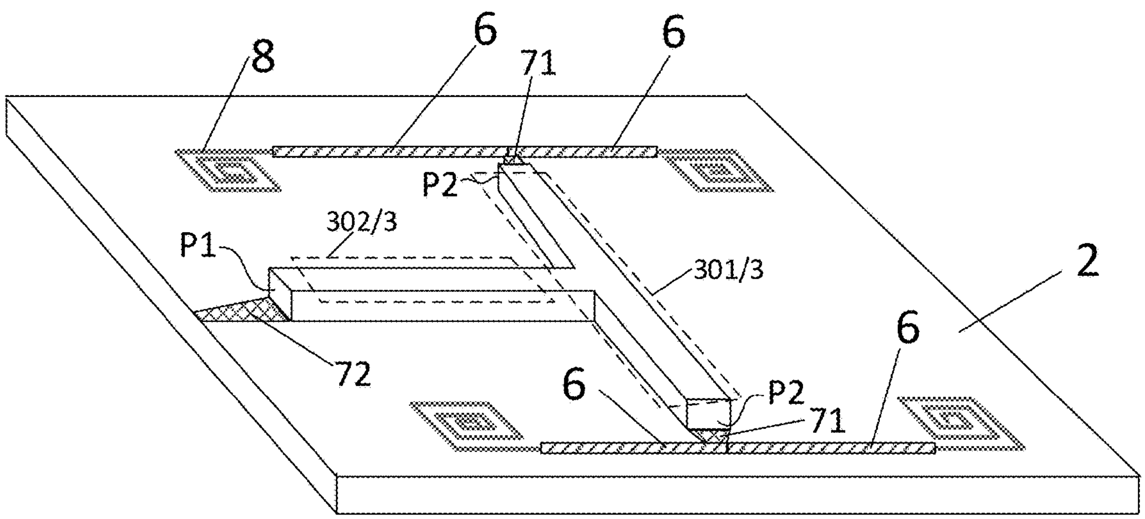
FIG. 2 is a schematic perspective view showing a structure of an antenna according to an embodiment of the present disclosure.
Figure 3:
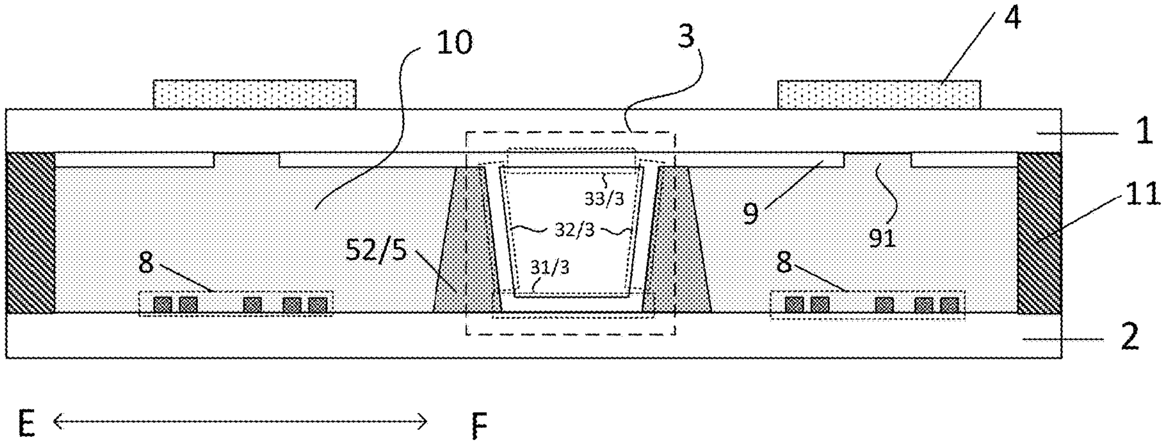
FIG. 3 is a schematic cross-sectional view of the antenna shown in FIG. 1 taken along a line E-F.

In a first aspect, as shown in FIGS. 1 to 3, the present embodiment provides an antenna, which may include a first substrate 1, a second substrate 2, a waveguide power division structure 3, and a plurality of radiation units (or radiation elements) 4. It should be noted that, in FIGS. 1 to 3, in order to clearly illustrate a structure of the antenna, FIG. 1 is a schematic top view of the antenna according to the present embodiment in a case where the first substrate 1 and a first conductive layer 9 located on the top of the waveguide power division structure 3 are omitted; FIG. 2 is a schematic perspective view showing the structure of the antenna according to the present embodiment in a case where the first substrate 1 and the first conductive layer 9 located on the top of the waveguide power division structure 3 are omitted; and FIG. 3 is a schematic cross-sectional view of the antenna shown in FIG. 1 taken along a line E-F in a case where the antenna includes the first substrate 1 and the first conductive layer 9 located on the top of the waveguide power division structure 3.

As shown in FIGS. 1 to 3, the first substrate 1 and the second substrate 2 are disposed opposite to each other, and the plurality of radiation units 4 are disposed on a side of the first substrate 1 distal to the second substrate 2. The waveguide power division structure 3 is located between the first substrate 1 and the second substrate 2, and adopts a waveguide structure as a power divider for a microwave signal to be transmitted by the antenna. Referring to FIGS. 1 and 2, the waveguide power division structure 3 has a waveguide cavity having a plurality of openings, and the plurality of openings includes an input opening (which may also be referred to as an input port) P1 and a plurality of output openings (which may also be referred to as output ports) P2. A signal (i.e., a microwave signal) is input into the waveguide cavity of the waveguide power division structure 3 through the input opening P1 of the waveguide power division structure 3, and the waveguide power division structure 3 divides the signal into a plurality of sub-signals. The plurality of sub-signals are output through the plurality of output openings P2 of the waveguide power division structure 3, respectively (e.g., the plurality of sub-signals may be in one-to-one correspondence with the plurality of output openings P2), and each of the output openings P2 may output one of the plurality of sub-signals to at least one of the radiation units 4. Each of the radiation units 4 sends out its received sub-signal. In the antenna according to the present embodiment, a signal loss of the signal during transmission mainly includes a radiation loss, a transmission loss, and a dielectric loss. Since the waveguide power division structure 3 is adopted in the power division structure of the antenna according to the present embodiment, i.e., since the waveguide structure is used as the power divider for a microwave signal to be transmitted by the antenna, and the waveguide power division structure 3 has the waveguide cavity, after a signal is input into the waveguide cavity through the input opening P1 of the waveguide power division structure 3, the signal is confined and transmitted in the waveguide cavity, such that the radiation loss of the signal during transmission is effectively reduced, and the signal is prevented from leaking out. In addition, compared with an antenna adopting a microstrip as a power divider, the waveguide structure can greatly reduce the transmission loss of the signal. Further, compared with the antenna adopting a microstrip where a signal is transmitted in liquid crystal after being input into the power division structure, in the antenna according to the present embodiment, the waveguide cavity is a hollow structure in which an air medium is filled, such that a signal is transmitted in the air medium in the waveguide cavity after the signal is input into the waveguide power division structure 3. Compared with liquid crystal, the air medium can effectively reduce the medium loss of the signal during transmission. As such, the antenna according to the present embodiment can effectively reduce the signal loss of the antenna.

A simulation has been performed by taking an example in which the waveguide power division structure 3 of the antenna according to the present embodiment is a rectangular waveguide, which has a width of 2.286 cm, a height of 1.016 cm, and a dielectric constant (i.e., a permittivity) of 1. Further, the simulation has been performed by taking an example antenna as a comparison reference, and the example antenna adopts a microstrip as a power division structure; the example antenna has an impedance of 50 ohms, and the microstrip has a thickness of 0.05 cm and a linewidth of 0.094 cm. In the simulation, a signal with a frequency of 10 Ghz is input into the waveguide power division structure 3. Results of the simulation show that the total signal loss of the signal during transmission in the waveguide power division structure 3 is 0.0131 dB/cm, in which the dielectric loss is about 0.0121 dB/cm, and a conductor loss (i.e., the sum of the transmission loss and the radiation loss) is about 0.0011 dB/cm. In contrast, the total loss of a signal transmitted in the power division structure formed by a microstrip is 0.0458 dB/cm, including the dielectric loss of 0.0154 dB/cm, and the conductor loss of 0.0304 dB/cm. The above results of the simulation verify that, the antenna according to the present embodiment can effectively reduce the signal loss of the antenna.

Optionally, in the antenna according to the present embodiment, the waveguide power division structure 3 may be a power equal-division structure, i.e., the waveguide power division structure 3 may divide a signal input through the input opening P1 into the plurality of sub-signals having a same (or equal) power, and transmit the plurality of sub-signals to the output openings P2, such that the powers of the sub-signals output from the output openings P2 are equal (or substantially equal) to each other. Alternatively, the waveguide power division structure 3 may also be a power unequal-division structure, i.e., the waveguide power division structure 3 may divide the signal input through the input opening P1 into the plurality of sub-signals having different powers, respectively, and transmit the plurality of sub-signals to the output openings P2, which is not limited herein. The following description is made by taking an example in which the waveguide power division structure 3 is a power bisection structure. That is, the waveguide power division structure 3 includes one input opening P1 and two output openings P2, and equally divides the signal input through the input opening P1 into two sub-signals (each of which has a power equal to half of a power of the input signal); in addition, the two sub-signals are output through the two output openings P2, respectively.

Optionally, in the antenna according to the present embodiment, each output opening P2 of the waveguide power division structure 3 may correspond to one radiation element 4, or may correspond to a plurality of radiation elements 4. That is, the waveguide power division structure 3 may divide an input signal into a plurality of sub-signals having a same power, and the sub-signal output from each output opening P2 may be transmitted to one radiation element 4, or to a plurality of radiation elements 4, which is not limited herein. The following description is made by taking an example in which the waveguide power division structure 3 divides the input signal into two sub-signals having a same power, the two sub-signals are output from the two output openings P2, respectively, and each output opening P2 transmits the sub-signal to two radiation elements 4. Referring to FIGS. 2 and 3, each radiation element 4 corresponds to one second electrode 8, and each second electrode 8 receives the sub-signal output from one output opening P2 of the waveguide power division structure 3 and feeds the sub-signal to a corresponding radiation element 4 on the first substrate 1 (here, the corresponding radiation element 4 of each second electrode 8 may mean that the second electrode 8 and the radiation element 4 overlap each other in a direction perpendicular to the first substrate 1 or the second substrate 2, as shown in FIG. 3). The second electrode 8 will be described in further detail later.

Figure 5:
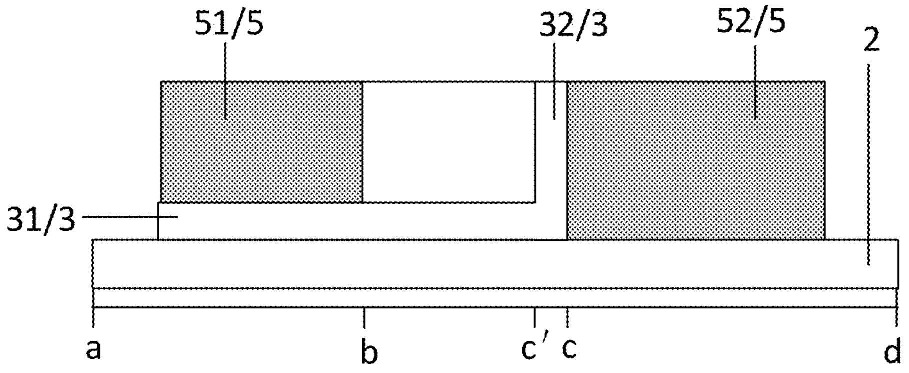
FIG. 5 is a schematic cross-sectional view of the portion of the antenna shown in FIG. 4 taken along a line a-b-c'-c-d.
Figure 6:
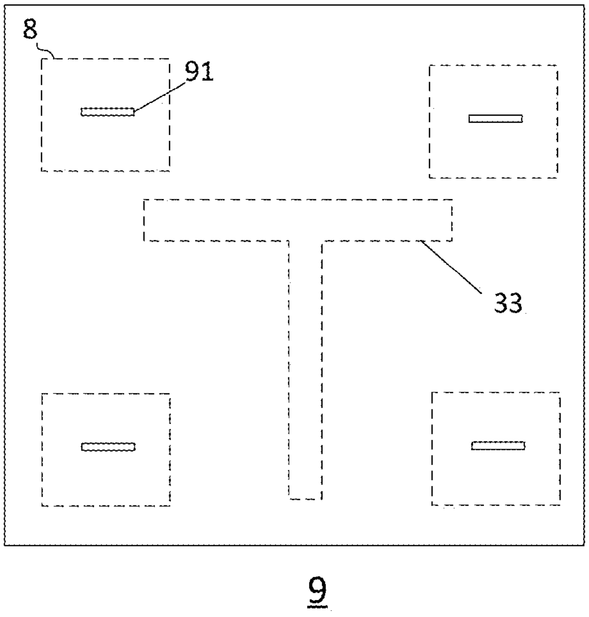
FIG. 6 is a schematic top view of a first conductive layer of an antenna according to an embodiment of the present disclosure.

Further, as shown in FIGS. 1 to 3, the antenna according to the present embodiment may further include the first conductive layer 9, a first electrode 31, a support wall 5, and a second conductive layer 32 located on an inner side of the support wall 5. Specifically, the first conductive layer 9 is disposed on a side of the first substrate 1 proximal to the second substrate 2, i.e., each radiation unit 4 and the first conductive layer 9 are disposed on two sides of the first substrate 1, respectively. Referring to FIG. 1, the first electrode 31 is disposed on a side of the second substrate 2 proximal to the first substrate 1, and the first electrode 31 serves as a bottom surface of the waveguide cavity of the waveguide power division structure 3. A shape of the first electrode 31 may be set according to the overall shape of the waveguide power division structure 3. For example, if the waveguide power division structure 3 is a rectangular waveguide (in a plan view as shown in FIG. 1), the first electrode 31 may be a rectangular electrode; or if the waveguide power division structure 3 is a T-shaped waveguide (in the plan view as shown in FIG. 1), the first electrode 31 is a T-shaped electrode as shown in FIG. 1. The support wall 5 is provided around the first electrode 31, and for example, the support wall 5 is provided on a peripheral portion of the first electrode 31 to surround a central portion of the first electrode 31 such that the peripheral portion of the first electrode 31 can extend below the support wall 5 to an outside of the support wall 5 (so as to be connected to impedance matching structures 71 and 72 which will be described later). For example, as shown in FIGS. 1, 3 and 5, the peripheral portion of the first electrode 31 may extend below first portions 51 of the support wall 5 to the outside of the first portions 51, whereas the peripheral portion of the first electrode 31 may not be located below second portions 52 of the support wall 5 but are located inside the second portions 52 (i.e., the second portions 52 of the support wall 5 surround the first electrode 31). The support wall 5, the first substrate 1 and the second substrate 2 may define a range (or space) for the waveguide power division structure 3. The inner side of the support wall 5 has the second conductive layer 32 thereon (e.g., the second conductive layer 32 may be continuously distributed on the entire inner side of each of the second portions 52 of the support wall 5, as shown in FIG. 1), and the second conductive layer 32 serves as a side surface of the waveguide cavity of the waveguide power division structure 3. The second conductive layer 32 is attached to the inner side of the support wall 5 and is connected to the first electrode 31 on the second substrate 2. In addition, the first conductive layer 9 covers a side of the support wall 5 proximal to the first substrate 1, and is connected to the second conductive layer 32 inside the support wall 5. As such, the second conductive layer 32, the first electrode 31, and a portion 33 of the first conductive layer 9 corresponding to the first electrode 32 (i.e., a portion of the first conductive layer 9 located within a ring defined by the support wall 5) are connected to each other to form the waveguide cavity of the waveguide power division structure 3. The second conductive layer 32 serves as the side surface of the waveguide cavity, the first electrode 31 serves as the bottom surface of the waveguide cavity, and the portion of the first conductive layer 9 corresponding to the first electrode 31 serves as a top surface of the waveguide cavity. In the waveguide cavity formed by the second conductive layer 32 serving as the side surface of the waveguide cavity, the first electrode 31 serving as the bottom surface of the waveguide cavity, and the portion of the first conductive layer 9 corresponding to the first electrode 31, a signal may be input through the input opening P1 of the waveguide cavity, and the signal is limited and transmitted in the waveguide cavity, thereby effectively reducing the signal loss. Finally, the signal may be output from the output openings P2 of the waveguide cavity.

Optionally, in the antenna according to the present embodiment, the specific structure of the waveguide power division structure 3 may include any one of various types. For example, in the plan view shown in FIG. 1, the waveguide power division structure 3 may include any one of a cross-shaped waveguide cavity, a rectangular waveguide cavity, a T-shaped waveguide cavity, and a fork-shaped waveguide cavity, and may alternatively include any one of a substantially cross-shaped waveguide cavity, a substantially rectangular waveguide cavity, a substantially T-shaped waveguide cavity, and a substantially fork-shaped waveguide cavity, as long as the cavity can form a waveguide. Therefore, the shape of the first electrode 31 or the second conductive layer 32 may be set according to the shape of the waveguide power division structure 3, which is not limited herein. As shown in FIGS. 1 to 3, description will be further made by taking an example in which the waveguide power division structure 3 has the T-shaped waveguide cavity in the plan view as shown in FIG. 1. In this case, the first electrode 31 is a T-shaped electrode (as shown in FIG. 1), and the support wall 5 is disposed around the T-shaped electrode (i.e., the first electrode 31), such that an area surrounded by the support wall 5 is also T-shaped in the plan view shown in FIG. 1. As such, the second conductive layer 32 on the inner side of the support wall 5 is also disposed along an edge of the T-shaped electrode and is closely connected to the T-shaped electrode. The first conductive layer 9 is disposed on the side of the first substrate 1 proximal to the second substrate 2, covers the side of the support wall 5 proximal to the first substrate 1, and is connected to the second conductive layer 32 on the inner side of the support wall 5. In this way, the second conductive layer 32, the T-shaped electrode (i.e., the first electrode 31), and the portion of the first conductive layer 9 corresponding to the T-shaped electrode are connected to each other to form the T-shaped waveguide cavity (as shown in FIG. 2). Referring to FIG. 2, the T-shaped waveguide cavity has a first cavity 301 and a second cavity 302, and extension directions of the first cavity 301 and the second cavity 302 are perpendicular to each other. That is, the first cavity 301 is a horizontal cavity (or a horizontal portion) of the T-shaped waveguide cavity, the second cavity 302 is a vertical cavity (or a vertical portion) of the T-shaped waveguide cavity, and the first cavity 301 and the second cavity 302 communicate with each other to form the T-shaped waveguide cavity. Specifically, the waveguide power division structure 3 including the T-shaped waveguide cavity has one input opening P1 and two output openings P2, and two ends of the first cavity 301 are the two output openings P2 of the waveguide power division structure 3, respectively. One end of the second cavity 302 is connected to a middle portion of the first cavity 301 so as to allow the second cavity 302 to communicate with the first cavity 301, and the other end of the second cavity 302 is the input opening P1 of the waveguide power division structure 3. As described above, the waveguide cavity of the waveguide power division structure 3 may also have another type of structure, which is not limited herein.

It should be noted that, the middle portion of the first cavity 301 is a portion at a position of one half of the total length of the first cavity 301 in a length direction of the first cavity 301 (e.g., a portion of the first cavity 301 at the midpoint in the length direction). The second cavity 302 is connected to the position at one half of the total length of the first cavity 301, and the second cavity 302 communicates with the first cavity 301 to form the T-shaped waveguide cavity.

Further, in the antenna according to the present embodiment, the side surface of the waveguide cavity of the waveguide power division structure 3 is the second conductive layer 32 disposed on the inner side of the support wall 5. Since a thickness of the second conductive layer 32 is small and a support force of the second conductive layer 32 may be insufficient, the support wall 5 is further provided such that the support wall 5 and the second conductive layer 32 together support and maintain the structure of the T-shaped waveguide cavity between the first substrate 1 and the second substrate 2. Thus, the support wall 5 is disposed around the first electrode 31. For example, the support wall 5 is disposed on the peripheral portion of the first electrode 31 and surrounds the central portion of the first electrode 31 such that the peripheral portion of the first electrode 31 may extend below the support wall 5 to the outside of the support wall 5 (so as to be connected to impedance matching structures 71 and 72 to be described later), and the second conductive layer 32 may be attached to the inner side of the support wall 5. In this way, the second conductive layer 32 may be formed between the first substrate 1 and the second substrate 2 by means of the support force of the support wall 5 to serve as the side surface of the waveguide cavity, and may be closely connected to the first electrode 31 and the portion 33 of the first conductive layer 9 corresponding to the first electrode 31, to form the waveguide cavity. Further, the support wall 5 may also serve as a support member for maintaining a certain space formed between the first substrate 1 and the second substrate 2.

Further, referring to FIG. 3, in the antenna according to the present embodiment, the side surface (i.e., the second conductive layer 32) of the waveguide cavity of the waveguide power division structure 3 may be disposed vertically with respect to the first substrate 1 or the second substrate 2, or may be disposed obliquely with respect to the first substrate 1 or the second substrate 2. Taking the example of FIG. 3 in which the second conductive layer 32 is disposed obliquely with respect to the second substrate 2 such that a cross section of the waveguide cavity is gradually increased in a direction from the second substrate 2 to the first substrate 1, the support wall 5 provides the support force for the second conductive layer 32, and thus the support wall 5 may be a dam whose thickness (i.e., a size of the second portion 52 of the support wall 5 on the left side or on the right side in a direction parallel to the first substrate 1 or the second substrate 2, in FIG. 3) is gradually decreased in the direction from the second substrate 2 to the first substrate 1. However, the structures of the support wall 5 and the second conductive layer 32 are not limited thereto. For example, each first portion 51 and each second portion 52 of the support wall 5 may have a same width.

Further, in the antenna according to the present embodiment, a thickness of a wall (e.g., a size of the second conductive layer 32 in the direction parallel to the first substrate 1 or the second substrate 2, or a size of any one of the first electrode 31 and the first conductive layer 9 in a direction perpendicular to the first substrate 1 or the second substrate 2) of the waveguide cavity of the waveguide power division structure 3 may be greater than a skin depth of the transmitted signal (e.g., a microwave signal). For example, the thickness of the wall of the waveguide cavity of the waveguide power division structure 3 may be greater than 3 to 5 times the skin depth of the transmitted signal, so as to ensure that the signal can be confined in the waveguide cavity of the waveguide power division structure 3, and avoid an excessive thickness that leads to an excessive mass of the antenna. It should be noted that, the thickness of the wall of the waveguide cavity is the thickness of any one of the second conductive layer 32, the first electrode 31, and the first conductive layer 9. For example, the second conductive layer 32, the first electrode 31, and the first conductive layer 9 may have a same thickness.

Figure 4:
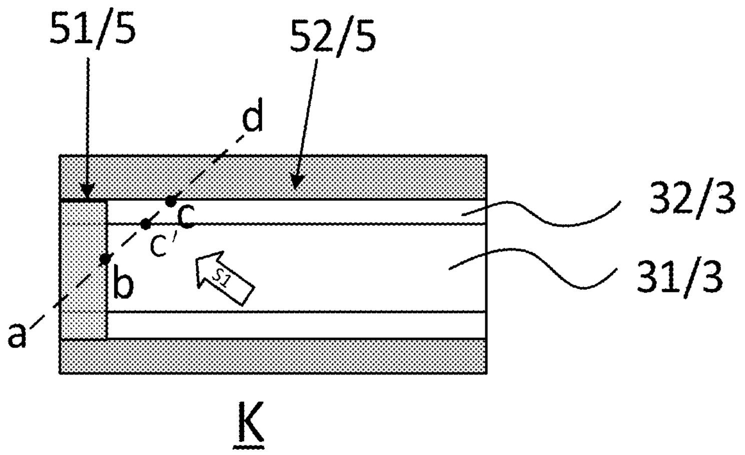
FIG. 4 is a schematic diagram showing a structure of a portion of the antenna shown in FIG. 1 within a dashed box K.

Further, as shown in FIGS. 1, 4 and 5 among which FIG. 4 is a schematic diagram showing a structure of a portion of the antenna shown in FIG. 1 within a dashed box K, and FIG. 5 is a schematic cross-sectional view of the portion of the antenna shown in FIG. 4 taken along line a-b-c'-c-d and viewed along the direction S1 as shown in FIG. 4. In the antenna according to the present embodiment, the first electrode 31 serves as the bottom surface of the waveguide cavity of the waveguide power division structure 3, and the shape of the first electrode 31 is consistent with the overall shape of the waveguide cavity (i.e., both are T-shaped). Thus, the first electrode 31 has a plurality of ends corresponding to the input opening P1 of the waveguide cavity and the output openings P2 of the waveguide cavity. That is, the first electrode 31, the second conductive layer 32, and the first conductive layer 9 form a waveguide cavity, and the waveguide cavity has the input opening P1 and the output openings P2. The first electrode 31 serves as the bottom surface of the waveguide cavity, and the ends of the first electrode 31 are portions of the first electrode 31 located at the input opening P1 and the output openings P2 of the waveguide cavity, respectively. FIG. 4 shows the output opening P2 on the left side of the waveguide power division structure 3 having the T-shaped cavity as shown in FIG. 1. Referring to FIG. 4, the support wall 5 is disposed around the first electrode 31. For example, the support wall 5 is disposed on the peripheral portion of the first electrode 31 and surrounds the central portion of the first electrode 31 such that the peripheral portion of the first electrode 31 may extend below the support wall 5 to the outside of the support wall 5 (so as to be connected to impedance matching structures 71 and 72 to be described later). The support wall 5 includes the first portions 51 and the second portions 52. The first portions 51 of the support wall 5 are portions of the support wall 5 corresponding to (e.g., being in contact with) a plurality of ends of the first electrode 31, and the remaining portions of the support wall 5 except for the first portions 51 are the second portions 52. That is, the first portions 51 of the support wall 5 are portions of the support wall 5 that surround (e.g., are in contact with) the ends of the first electrode 31, and the second portions 52 of the support wall 5 are portions of the support wall 5 that surround (e.g., are in contact with) portions of the first electrode 31, except the ends of the first electrode 31, or that surround (e.g., are in contact with) the second conductive layer 32. For example, referring to FIG. 5, each first portion 51 of the support wall 5 is disposed on a side of the first electrode 31 proximal to the first substrate 1, and each second portion 52 of the support wall 5 is disposed on the side of the second substrate 2 proximal to the first substrate 1. The first electrode 31 is disposed on the side of the second substrate 2 proximal to the first substrate 1, and the second conductive layer 32 is disposed only on the inner side of each second portion 52 of the support wall 5 but is not disposed on the inner side of each first portion 51 of the support wall 5. That is, the remaining portions (i.e., the second portions 52) of the support wall 5 except for the portions (i.e., the first portions 51) corresponding to the ends of the first electrode 31 are disposed at an outer side of the first electrode 31 and directly on the second substrate 2, while the portions (i.e., the first portions 51) of the support wall 5 corresponding to the ends of the first electrode 31 are disposed directly on the ends of the first electrode 31 without being in direct contact with the second substrate 2. The second conductive layer 32 is disposed only on the inner side of each of the second portions 52. In this way, it can be ensured that the input opening P1 or each output opening P2 of the waveguide cavity is not sealed by the conductive material (i.e., it can be ensured that a signal can be input to or output from the inside of the waveguide cavity), such that the input opening P1 or each output opening P2 of the waveguide cavity becomes an opening capable of transmitting a signal (i.e., an electromagnetic wave). Further, the first portions 51 corresponding to the input opening P1 and each output opening P2 (i.e., corresponding to the ends of the first electrode 31) are disposed directly on the ends of the first electrode 31, not directly on the second substrate 2, thereby ensuring that the ends of the first electrode 31 can extend beyond the support wall 5 to be electrically connected with a subsequent structure (e.g., the impedance matching structure 71 or 72 to be described later), so as to output a sub-signal from the end of the first electrode 31 to the corresponding radiation element 4. Moreover, the first portions 51 disposed on the ends of the first electrode 31 can further serve as sealing portions to seal the input opening P1 and each output opening P2 of the waveguide cavity of the waveguide power division structure 3, so as to prevent a medium (e.g., liquid crystal molecules) outside the waveguide cavity from flowing into the waveguide cavity to increase the medium loss of a signal during transmission. For example, a dielectric layer is disposed between the first substrate 1 and the second substrate 2, and the dielectric layer includes liquid crystal molecules. In this case, the first portions 51 can seal the input opening P1 and each output opening P2 of the waveguide cavity to prevent the liquid crystal molecules from flowing into the waveguide cavity. It should be noted that, in order to illustrate the positional relationship between the first portions 51 of the support wall 5 and the first electrode 31, the relevant layers of the support wall 5 in FIGS. 1 and 4 are schematically illustrated with a certain transparency to illustrate the first electrode 31 under the first portions 51 of the support wall 5.

Further, as shown in FIGS. 1 and 2, the antenna according to the present embodiment may further include a plurality of transmission structures 6. The plurality of transmission structures 6 are disposed on the side of the second substrate 2 proximal to the first substrate 1, and may be disposed in the same layer as the first electrode 31. Each transmission structure 6 is connected to one of the plurality of output openings P2 of the waveguide power division structure 3, and is further connected to a second electrode 8. Each second electrode 8 may correspond to one of the radiation elements 4 and may feed a signal to the corresponding radiation element 4. Each transmission structure 6 transmits the sub-signal output from the corresponding output opening P2 of the waveguide power division structure 3 to the second electrode 8 corresponding to the transmission structure 6, and the second electrode 8 transmits the sub-signal to the radiation unit 4 corresponding to the second electrode 8. For example, the plurality of transmission structures 6 are in one-to-one correspondence with the plurality of radiation units 4, and each output opening P2 may correspond to one or more transmission structures 6. One output opening P2 of the waveguide power division structure 3 may be connected to one or more transmission structures 6, i.e., the sub-signal output from the output opening P2 of the waveguide power division structure 3 may be transmitted to one or more radiation units 4, which is not limited herein. In the present embodiment, the description is made by taking an example in which one output opening P2 is connected to two transmission structures 6.

Optionally, each transmission structure 6 may include any one of various types of transmission structures, and for example, each transmission structure 6 may be a microstrip, one end of the microstrip being connected to the output opening P2 of the waveguide power division structure 3 corresponding to the micro strip, and the other end of the microstrip being connected to the second electrode 8 corresponding to the radiation unit 4 that corresponds to the microstrip. The second electrode 8 receives the sub-signal transmitted by the microstrip and then feeds the sub-signal to the radiation unit 4.

Optionally, as shown in FIGS. 1 and 2, the antenna according to the present embodiment may further include a plurality of impedance matching structures 71 in one-to-one correspondence with the plurality of output openings P2, and each of the impedance matching structures 71 is disposed on the side of the second substrate 2 proximal to the first substrate 1. That is, each of the impedance matching structures 71 may be disposed in the same layer as the first electrode 31, and each impedance matching structure 71 is connected between at least one (e.g., two as shown in FIG. 1 or 2) transmission structure 6 and the output opening P2 of the waveguide power division structure 3 corresponding to the at least one transmission structure 6. Further, each impedance matching structure 71 may match an impedance of the at least one transmission structure 6 to an impedance of the waveguide power division structure 3, such that a signal can be transmitted from the output opening P2 to the at least one transmission structure 6, and the signal loss during transmission is reduced. Specifically, each impedance matching structure 71 may be connected to one of the ends of the first electrode 31 which serves as the bottom surface of the waveguide cavity of the waveguide power division structure 3, to receive the sub-signal transmitted from the end of the first electrode 31.

Optionally, each impedance matching structure 71 may have any one of a variety of types of structures. For example, each impedance matching structure 71 is a trapezoid (or trapezoidal) electrode (e.g., an isosceles trapezoid electrode) in the plan view as shown in FIG. 1, and a longer side of two parallel sides of the trapezoid electrode (i.e., the impedance matching structure 71) is connected to the output opening P2 of the waveguide power division structure 3. For example, the longer side of the two parallel sides of the trapezoid electrode is connected to the end, which corresponds to the output opening P2, of the first electrode 31 serving as the bottom surface of the waveguide cavity of the waveguide power division structure 3, and a shorter side of the two parallel sides of the trapezoid electrode is connected to the transmission structure 6 corresponding to the output opening P2. Since each impedance matching structure 71 is the trapezoid electrode, a width of the trapezoid electrode is gradually reduced in a direction from the longer side of the two parallel sides to the shorter side of the two parallel sides, and a thickness of the trapezoid electrode is unchanged in the direction. Thus, an impedance of the trapezoid electrode is gradually increased in the direction, such that the impedance in the direction from the longer side of the two parallel sides to the shorter side of the two parallel sides can be changed. In other words, by controlling parameters such as a length of the longer side of the two parallel sides of the trapezoid electrode, a length of the shorter side of the two parallel sides, and a height (i.e., a distance between the two parallel sides) of the trapezoid electrode, the impedance of the waveguide power division structure 3 and the impedance of the transmission structure 6 can be matched to each other.

Optionally, as shown in FIGS. 1 and 2, the antenna according to the present embodiment may further include an input opening impedance matching structure 72. The input opening impedance matching structure 72 is also disposed on the side of the second substrate 2 proximal to the first substrate 1, and may match an impedance of an external signal input device (e.g., a front-end feeding circuit) and the impedance of the waveguide power division structure 3 to each other. The input opening impedance matching structure 72 may also be a trapezoid electrode (e.g., an isosceles trapezoid electrode), and a longer side of two parallel sides of the trapezoid electrode (i.e., the input opening impedance matching structure 72) is connected to the input opening P1 of the waveguide power division structure 3. Specifically, the longer side of the two parallel sides of the trapezoid electrode may be connected to the end, which corresponds to the input opening P1, of the first electrode 31 serving as the bottom surface of the waveguide cavity of the waveguide power division structure 3, and a shorter side of the two parallel sides of the trapezoid electrode is connected to the external signal input device corresponding to the input opening P1. In this way, by controlling parameters such as a length of the longer side of the two parallel sides of the trapezoid electrode, a length of the shorter side of the two parallel sides, and a height (i.e., a distance between the two parallel sides) of the trapezoid electrode, the impedance of the waveguide power division structure 3 and the impedance of the external signal input device can be matched to each other.

Optionally, as shown in FIGS. 1 to 3 and FIG. 6, the antenna according to the present embodiment includes the first conductive layer 9, which is disposed on the side of the first substrate 1 proximal to the second substrate 2. The radiation units 4 are disposed on the side of the first substrate 1 opposite to the first conductive layer 9, and the portion of the first conductive layer 9 corresponding to the first electrode 31 (i.e., the portion of the first conductive layer 9 located in the ring defined by the support wall 5) serves as the top surface of the waveguide cavity of the waveguide power division structure 3. The antenna may further include a plurality of second electrodes 8, and the plurality of second electrodes 8 may be in one-to-one correspondence with the plurality of transmission structures 6 and be disposed on the side of the second substrate 2 proximal to the first substrate 1. Each of the second electrodes 8 is connected to one of the plurality of output openings P2 of the waveguide power division structure 3. That is, one output opening P2 may transmit the sub-signal to one or more second electrodes 8. The second electrodes 8 and the first conductive layer 9 serve as a feeding electrode for the radiation units 4, and may feed the sub-signals output from the output openings P2 of the waveguide power division structure 3 into the radiation units 4. For example, referring to FIG. 6 which is a schematic top view of the first conductive layer 9, in order to illustrate a positional relationship of the second electrodes 8 with respect to the first conductive layer 9, an orthographic projection of each of the second electrodes 8 on the first conductive layer 9 is illustrated by a dashed box in FIG. 6. The first conductive layer 9 has a plurality of slits 91 therein, and the plurality of second electrodes 8 are in one-to-one correspondence with the plurality of slits 91. That is, each second electrode 8 feeds a sub-signal through one slit 91 to the radiation unit 4 arranged on a side of the one slit 91 distal to the second substrate 2. For example, an orthographic projection of each slit 91 on the second substrate 2 and an orthographic projection of the second electrode 8 corresponding to the slit 91 on the second substrate 2 have an overlapping area (or overlap each other), and the plurality of radiation units 4 are also in one-to-one correspondence with the plurality of slits 91. That is, each radiation unit 4 is disposed on the side of one slit 91 distal to the second substrate 2, the sub-signal from each second electrode 8 is transmitted to the radiation unit 4 corresponding to a corresponding slit 91 through the corresponding slit 91, and an orthographic projection of the corresponding radiation unit 4 on the second substrate 2 also overlap an orthographic projection of the corresponding slit 91 on the second substrate 2. In other words, the orthographic projection of each second electrode 8 on the second substrate 2, the orthographic projection of the corresponding slit 91 on the second substrate 2, and the orthographic projection of the corresponding radiation unit 4 on the second substrate 2 overlap each other. Thus, each second electrode 8 is connected to one output opening P2 of the waveguide power division structure 3 to receive the sub-signal output from the output opening P2, and transmits the received sub-signal through the slit 91 corresponding to the second electrode 8 (e.g., the slit 91 directly above the second electrode 8 in FIG. 3) to the radiation element 4 corresponding to the slit 91 (e.g., the radiation element 4 directly above the second electrode 8 in FIG. 3). That is, each slit 91 serves as a feeding port (or feeding opening) for the corresponding radiation unit 4, thereby allowing the microwave signal transmitted by the corresponding second electrode 8 to be fed through the slit 91 to the corresponding radiation unit 4.

Figure 7:
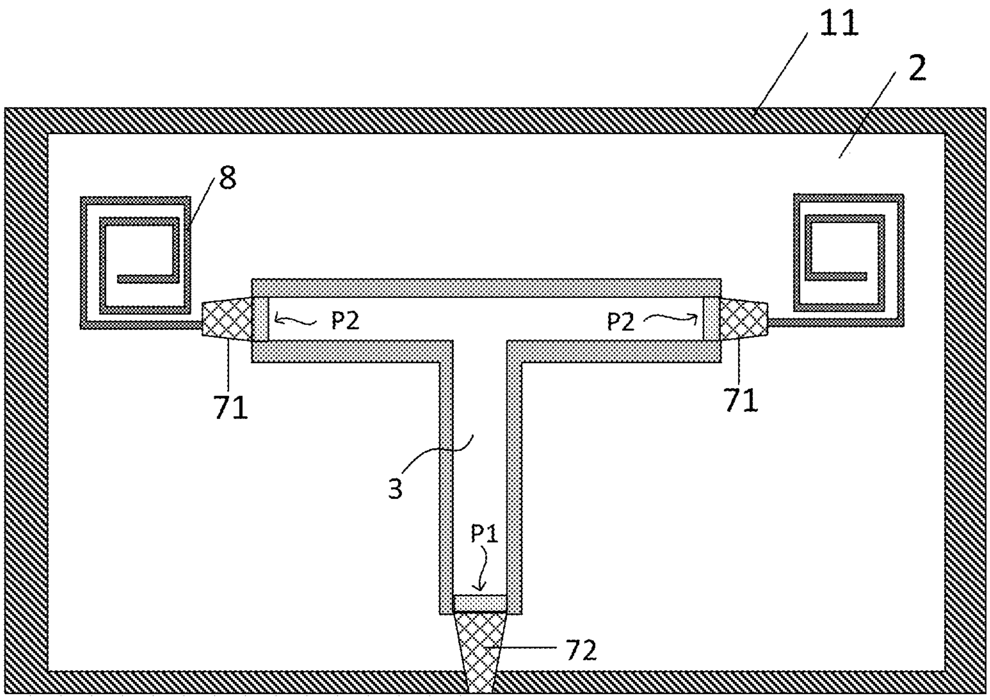
FIG. 7 is a schematic top view of another antenna according to an embodiment of the present disclosure.

Optionally, as shown in FIGS. 1 and 7, each second electrode 8 may be directly connected to one output opening P2 of the waveguide power division structure 3, and the impedance matching structure 71 is disposed between the second electrode 8 and the output opening P2 (as shown in FIG. 7). Alternatively, each second electrode 8 may also be connected to one output opening P2 of the waveguide power division structure 3 through one transmission structure 6, and the impedance matching structure 71 is disposed between the transmission structure 6 connected to the second electrode 8 and the output opening P2 (as shown in FIG. 1). In a case where each second electrode 8 is connected to one output opening P2 of the waveguide power division structure 3 through one transmission structure 6 (as shown in FIG. 1), one output opening P2 may transmit a sub-signal to more second electrodes 8, and thus to more radiation units 4. In other words, the plurality of transmission structures 6 are connected in one-to-one correspondence with the plurality of second electrodes 8, i.e., each transmission structure 6 is connected to one second electrode 8. Specifically, one end of each transmission structure 6 is connected to one output opening P2 of the waveguide power division structure 3, and the other end of the transmission structure 6 is connected to one second electrode 8. As such, the transmission structure 6 receives the sub-signal output from the output opening P2 of the waveguide power division structure 3 and transmits the received sub-signal to the second electrode 8 connected to the transmission structure 6, and the second electrode 8 feeds the sub-signal to the corresponding radiation unit 4 through the slit 91 of the first conductive layer 9 corresponding to the second electrode 8.

Further, referring to FIGS. 1 to 3, in the antenna according to the present embodiment, the first electrode 31, each second electrode 8, each transmission structure 6, each impedance matching structure 71, and the input opening impedance matching structure 72 may be disposed on the side of the second substrate 2 proximal to the first substrate 1, may be disposed in a same layer and may have a one-piece structure, and may be made of a same conductive material, for example, may be made of a metal conductive material such as copper, silver, or aluminum, or a semiconductor conductive material, which is not limited herein.

Optionally, referring to FIGS. 1 and 3, the antenna according to the present embodiment may further include a dielectric layer 10 disposed between the first substrate 1 and the second substrate 2, and a dielectric constant (i.e., a permittivity) of the dielectric layer 10 may be changed as a strength of an electric field formed between the first substrate 1 and the second substrate 2 is changed. Thus, during the transmission of the sub-signal (e.g., a microwave signal) from each second electrode 8 to the corresponding slit 91, the sub-signal passes through the dielectric layer 10, and a phase of the sub-signal may be shifted (or changed) by adjusting the dielectric constant of the dielectric layer 10. For example, the dielectric layer 10 may include any one of various types of media, and for example, the dielectric layer 10 may include liquid crystal molecules. An external voltage difference may be applied across the first conductive layer 9 and each of the second electrodes 8 to allow an electric field to be generated between the first conductive layer 9 and each of the second electrodes 8, and a rotation angle of the liquid crystal molecules may be controlled by changing a magnitude of the voltage difference, so as to change the dielectric constant of the dielectric layer (e.g., a liquid crystal layer) 10, thereby shifting (changing) a phase of each sub-signal. As described above, the waveguide cavity of the waveguide power division structure 3 is a hollow structure, and the waveguide cavity may be filled with an air medium (i.e., the air). In order to prevent the liquid crystal molecules from flowing into the waveguide cavity, the first portions 51 of the support wall 5 corresponding to the ends of the first electrode 31 can seal the input opening P1 and each output opening P2 of the waveguide cavity, thereby preventing the liquid crystal molecules from flowing into the waveguide cavity to increase the signal loss (i.e., preventing the signal loss from being increased).

Optionally, a sealant structure 11 may be further disposed on the second substrate 2, and may be disposed between the first substrate 1 and the second substrate 2 and at an edge of the first substrate 1 or the second substrate 2. The sealant structure 11 may seal the liquid crystal molecules between the first substrate 1 and the second substrate 2.

Optionally, each radiation unit 4 is disposed on the side of the first substrate 1 distal to the second substrate 2, and may be any one of various types of radiation antennas, such as a patch antenna, a horn antenna, a microstrip antenna, or the like, which is not limited herein.

It should be noted that the antenna according to the present embodiment may be applied to various antenna devices, and each of the antenna devices may have one or more antennas according to the present embodiment. Each of the antenna devices may include an upper substrate and a lower substrate, and a plurality of antennas according to the present embodiment may be arranged in an array on the lower substrate to form an antenna array. The first substrate of the antenna according to the present embodiment and the upper substrate may have a one-piece structure, and the second substrate of the antenna according to the present embodiment and the lower substrate may have a one-piece structure.

It should be noted that the antenna according to the present embodiment may transmit (or send) a signal and may receive a signal, and the functions of the input opening P1 and each output opening P2 of the waveguide power division structure 3 of the antenna may be interchanged. That is, in a case where the antenna receives a signal, each radiation unit 4 receives the signal, and then transmits the signal into the waveguide power division structure 3 through the corresponding output opening P2. Finally, the signal may be output to the outside of the waveguide power division structure 3 through the input opening P1 and the remaining output openings P2.

Figure 8:
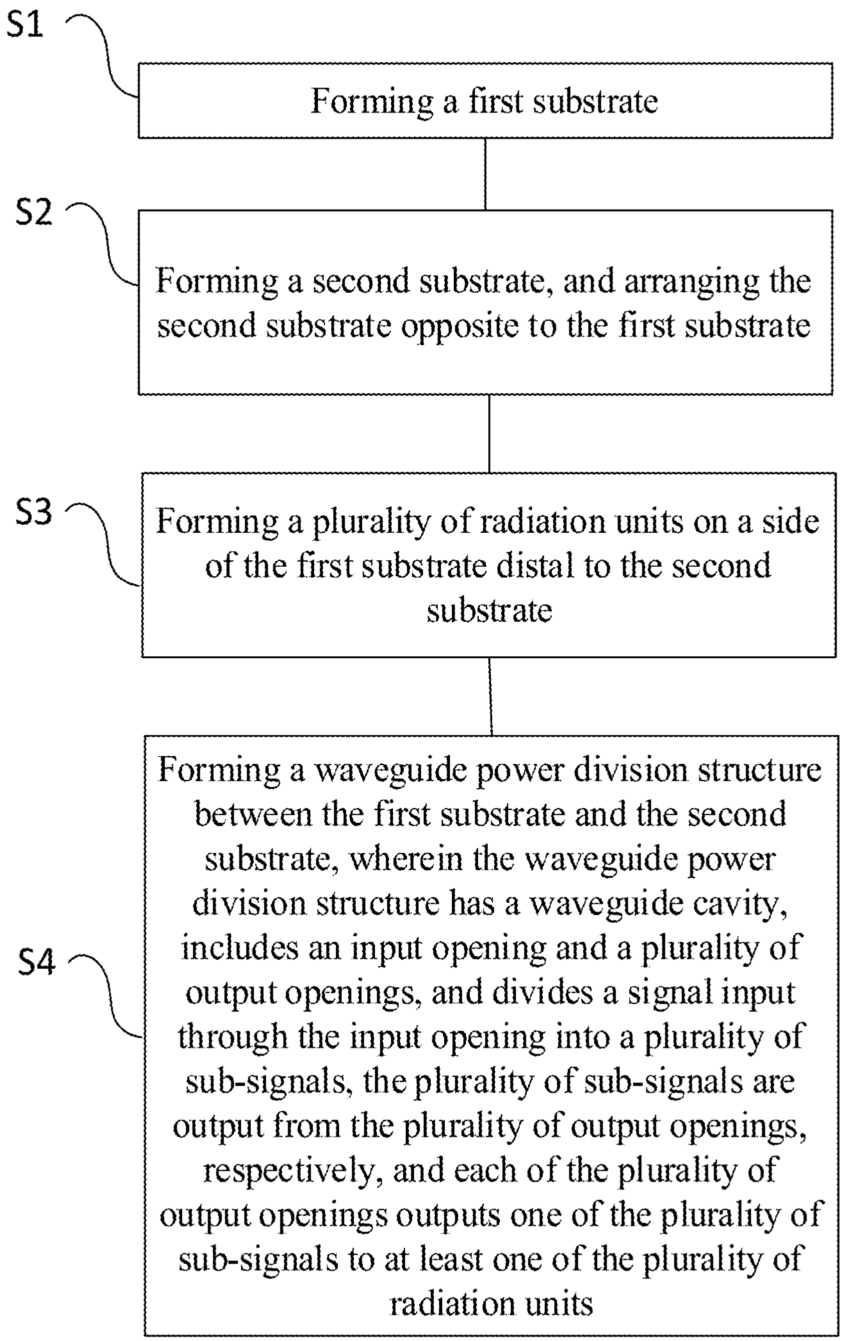
FIG. 8 is a schematic flowchart of a method for manufacturing an antenna according to an embodiment of the present disclosure.

In a second aspect, an embodiment of the present disclosure provides a method for manufacturing an antenna. As shown in FIG. 8, the method for manufacturing the antenna may include the following steps S1 to S4.

In step S1, the first substrate 1 is formed.

Specifically, the first substrate 1 may be any one of various types of substrates, such as a glass substrate. Further, the first substrate 1 may be cleaned before other components are formed on the first substrate 1, to prevent undesired impurities from remaining on the first substrate 1.

In step S2, the second substrate 2 is formed and disposed opposite to the first substrate 1.

Specifically, the second substrate 2 may be any one of various types of substrates, such as a glass substrate. In addition, the second substrate 2 may be cleaned before other components are formed on the second substrate 2, to prevent undesirable impurities from remaining on the second substrate 2.

In step S3, the plurality of radiation elements 4 are formed on the side of the first substrate 1 distal to the second substrate 2.

The plurality of radiation elements 4 may be formed on the side of the first substrate 1 distal to the second substrate 2 before other components are formed on the side of the first substrate 1 proximal to the second substrate 2. Each radiation unit 4 may be any one of various types of antenna structures, such as a patch antenna, a horn antenna, a microstrip antenna, or the like. In the present embodiment, description is made by taking an example in which each radiation unit 4 is a patch antenna.

In step S4, the waveguide power division structure 3 is formed to be located between the first substrate 1 and the second substrate 2 and have the waveguide cavity, such that the waveguide power division structure 3 includes one input opening P1 and the plurality of output openings P2, the waveguide power division structure 3 divides a signal input through the input opening P1 into a plurality of sub-signals, the plurality of sub-signals are output from the plurality of output openings P2, respectively, and each output opening P2 may output one of the plurality of sub-signals to at least one radiation unit 4.

Figure 9:
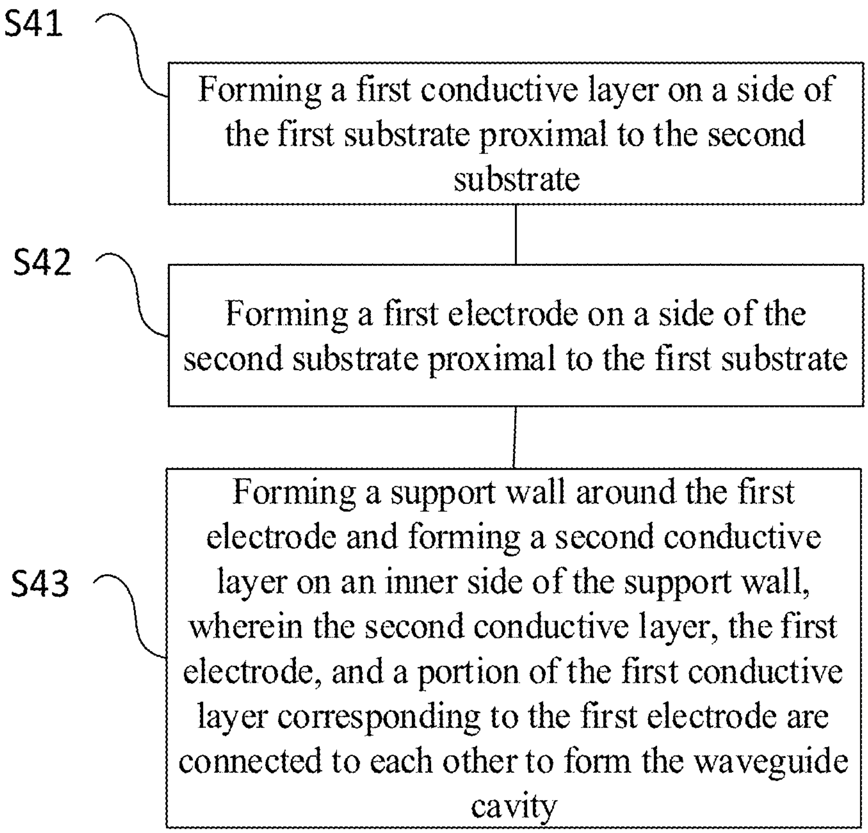
FIG. 9 is a schematic flowchart of step S4 of the method for manufacturing an antenna shown in FIG. 8.

For example, referring to FIG. 9, step S4 may include the following steps S41 to S43.

In step S41, the first conductive layer 9 is formed on the first substrate 1 proximal to the second substrate 2.

Figure 12:
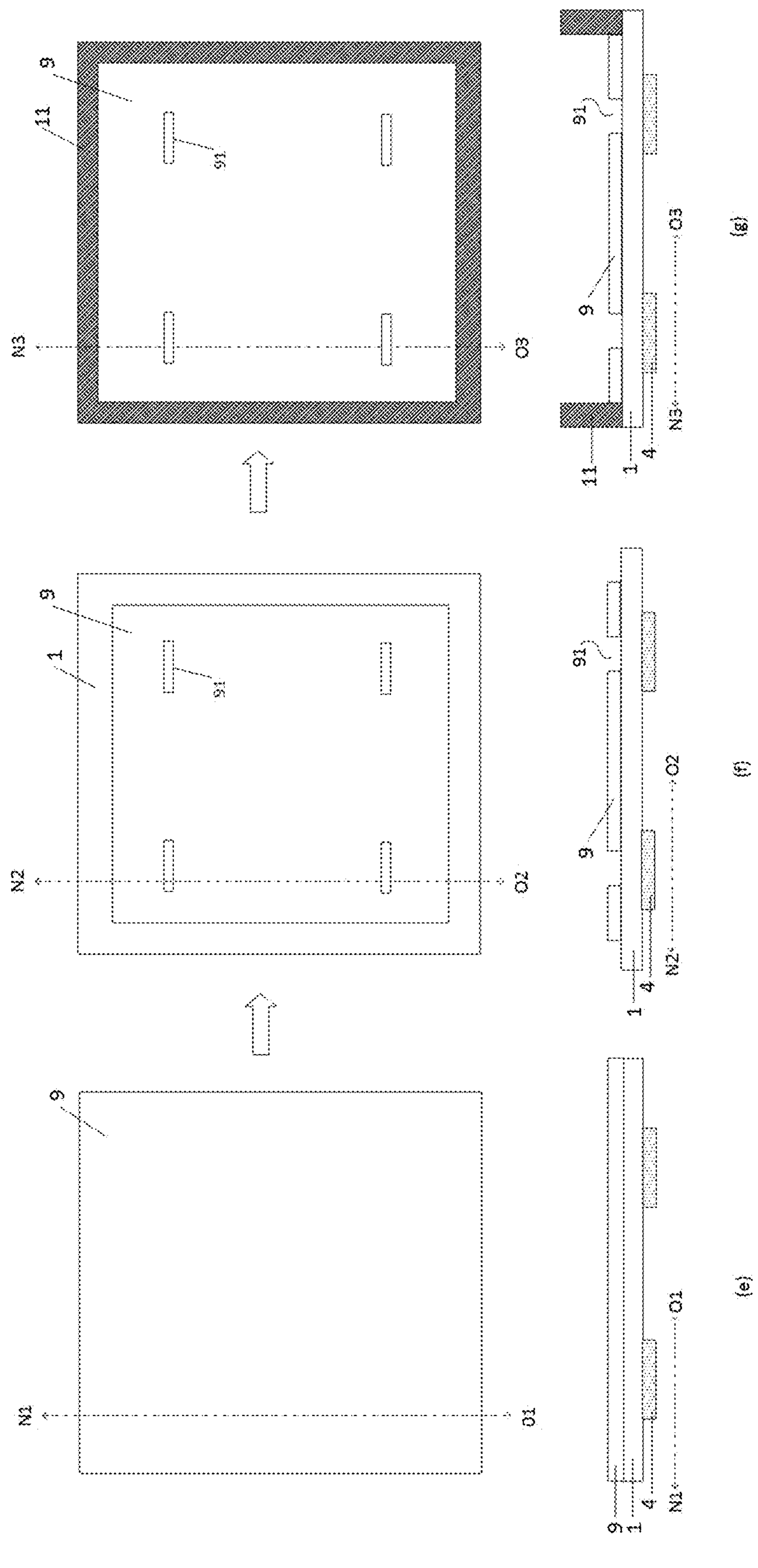
FIG. 12 is a schematic process flow diagram of a method for manufacturing an antenna according to an embodiment of the present disclosure (in which structures of a first substrate and related components on the first substrate are shown).

Specifically, referring to parts (e) to (f) of FIG. 12, a metal growth process is adopted to grow the first conductive layer 9 on the side of the first substrate 1 proximal to the second substrate 2, i.e., on the side of the first substrate 1 distal to the radiation units 4, and then the first conductive layer 9 is patterned according to positions where the plurality of slits 91 are to be formed in the first conductive layer 9, to remove the conductive material at the positions where the plurality of slits 91 are to be formed, so as to form the first conductive layer with the plurality of slits 91 therein. Then, referring to parts (f) to (g) of FIG. 12, a sealant is coated on a periphery of the first substrate 1 to form the sealant structure 11. In this way, after the first substrate 1 and the second substrate 2 are subsequently aligned with each other and assembled to form a cell, liquid crystal molecules are filled between the first substrate 1 and the second substrate 2, and the sealant structure 11 can seal the liquid crystal molecules between the first substrate 1 and the second substrate 2.

In step S42, the first electrode 31 is formed on the side of the second substrate 2 proximal to the first substrate 1.

Figure 11:
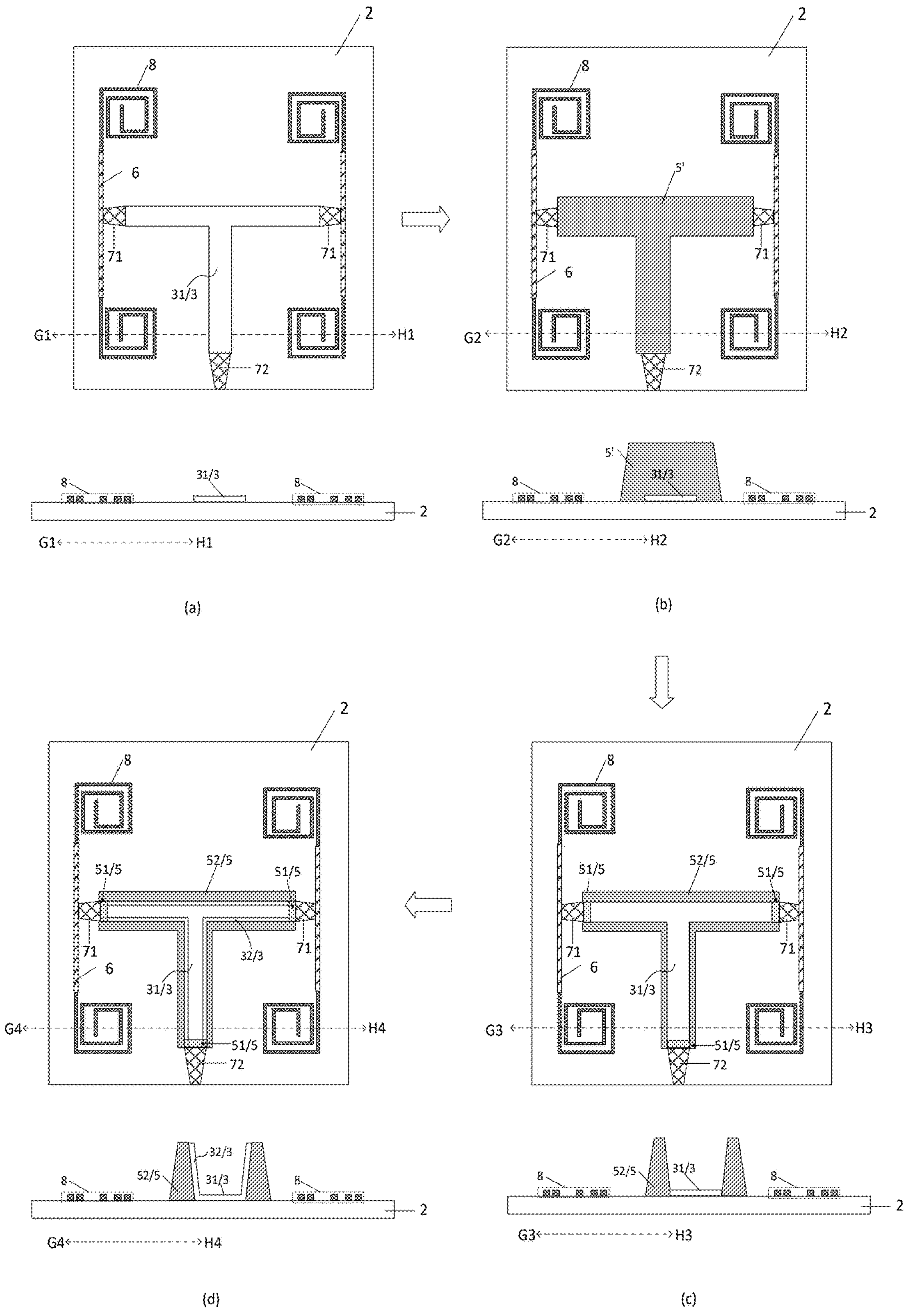
FIG. 11 is a schematic process flow diagram of a method for manufacturing an antenna according to an embodiment of the present disclosure (in which structures of a second substrate and related components on the second substrate are shown)

Specifically, referring to part (a) of FIG. 11, a conductive layer is formed on the side of the second substrate 2 proximal to the first substrate 1 by using the metal growth process, and then the conductive layer is patterned according to the shape (e.g., T shape) of the first electrode 31 to be formed, thereby forming the first electrode 31.

Further, referring to part (a) of FIG. 11, the plurality of transmission structures 6, the plurality of second electrodes 8, the plurality of impedance matching structures 71, and the input opening impedance matching structure 72 may be further formed on the side of the second substrate 2 proximal to the first substrate 1, and the plurality of transmission structures 6, the plurality of second electrodes 8, the plurality of impedance matching structures 71, the input opening impedance matching structure 72, and the first electrode 31 may be disposed in a same layer and have a one-piece structure. In this way, after the conductive layer is formed on the side of the second substrate 2 proximal to the first substrate 1, the respective components on the second substrate 2 as shown in part (a) of FIG. 11 may be formed through one patterning process in accordance with the structures of the first electrode 31, the plurality of transmission structures 6, the plurality of second electrodes 8, the plurality of impedance matching structures 71, and the input opening impedance matching structure 72.

In step S43, the support wall 5 is formed around the first electrode 31 such that the support wall 5 is disposed on the peripheral portion of the first electrode 31 and around the central portion of the first electrode 31, and the peripheral portion of the first electrode 31 extends below the support wall 5 to the outside of the support wall 5 (to be connected to the impedance matching structures 71 and 72); and the second conductive layer 32 is formed on the inner side of the support wall 5.

Figure 10:
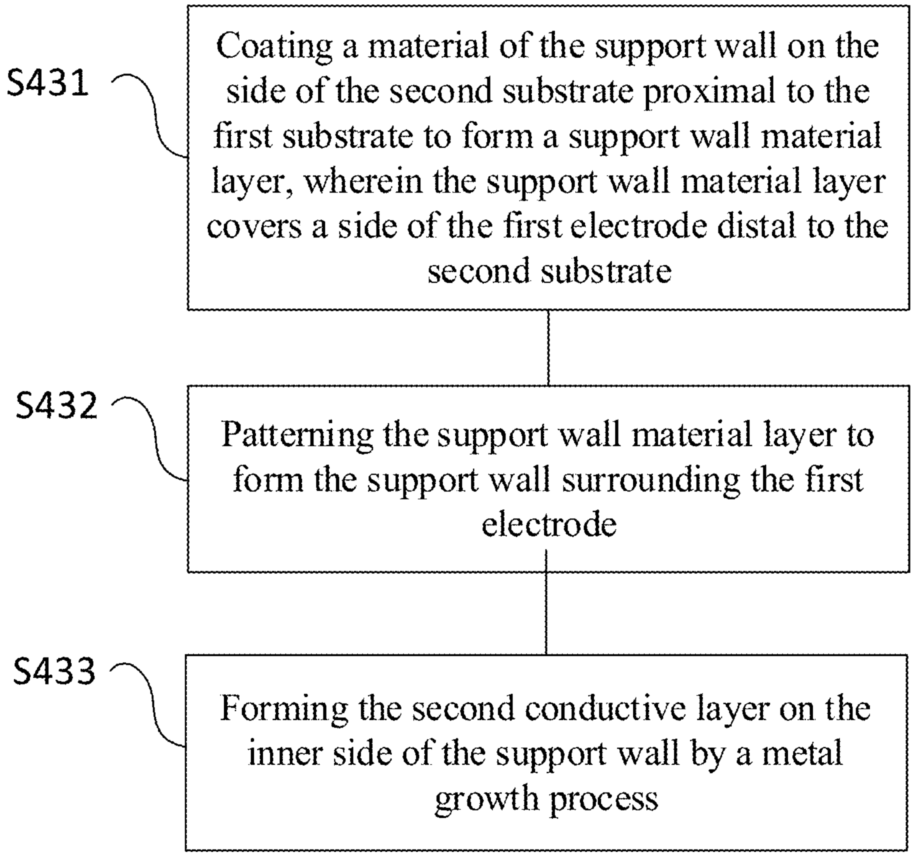
FIG. 10 is a schematic flowchart of step S43 of the method for manufacturing an antenna shown in FIG. 9.

For example, referring to FIG. 10 and parts (b) to (d) of FIG. 11, step S43 may include the following steps S431 to S433.

In step S431, a support wall material layer 5' is formed by coating a material of the support wall 5 on the side of the second substrate 2 proximal to the first substrate 1, and the support wall material layer 5' covers a side of the first electrode 31 distal to the second substrate 2.

Specifically, referring to part (b) of FIG. 11, the material layer of the support wall 5 is coated on the second substrate 2 to form the support wall material layer 5', and the support wall material layer 5' may not completely cover the first electrode 31 (as shown in FIG. 5), i.e. an orthographic projection of the first electrode 31 on the second substrate 2 may be located outside an orthographic projection of the support wall material layer 5' on the second substrate 2 (as shown in FIG. 5).

Optionally, the support wall material layer 5' (i.e., the material of the support wall 5) may be any one of a plurality of materials, such as a resin, a plastic, or the like, which is not limited herein.

In step S432, the support wall material layer 5' is patterned to form the support wall 5 surrounding the first electrode 31, i.e., the support wall 5 is formed to be disposed on the peripheral portion of the first electrode 31 and surround the central portion of the first electrode 31 such that the peripheral portion of the first electrode 31 extends below the support wall 5 to the outside of the support wall 5 (so as to be connected to the impedance matching structures 71 and 72).

Specifically, referring to parts (b) to (c) of FIG. 11, by using a mask for the support wall 5 and corresponding to the shape of the first electrode 31, the support wall material layer 5' may be patterned by an exposure process and a development process, to remove a portion of the support wall material layer 5' overlapping the central portion of the first electrode 31 so as to expose the central portion of the first electrode 31, thereby forming the support wall 5 which is disposed on the peripheral portion of the first electrode 31 and surrounds the central portion of the first electrode 31 such that the peripheral portion of the first electrode 31 may extend below the support wall 5 to the outside of the support wall 5 (so as to be connected to the impedance matching structures 71 and 72). Further, the support wall 5 includes the first portions 51 and the second portions 52. The first portions 51 of the support wall 5 are portions of the support wall 5 corresponding to a plurality of ends of the first electrode 31 (i.e., portions where the one input opening P1 and the plurality of output openings P2 are located), and the remaining portions of the support wall 5 except for the first portions 51 are the second portions 52. As described above, the first portions 51 of the support wall 5 are disposed on the side of the first electrode 31 proximal to the first substrate 1, whereas the second portions 52 of the support wall 5 are disposed on the side of the second substrate 2 proximal to the first substrate 1 and may be in direct contact with the second substrate 2. The first electrode 31 is disposed on the side of the second substrate 2 proximal to the first substrate 1.

In step S433, the second conductive layer 32 is formed only on the inner sides of the second portions 52 of the support wall 5 by the metal growth process, such that the second conductive layer 32, the first electrode 31, and the portion 33 (as shown in FIG. 3) of the first conductive layer 9 corresponding to the first electrode 31 are connected to each other to form the waveguide cavity of the waveguide power division structure 3.

Specifically, referring to parts (c) to (d) of FIG. 11, a conductive base layer is grown on the inner sides of the second portions 52 of the support wall 5 by the metal growth process, and then the conductive base layer is thickened by an electroplating process to form the second conductive layer 32. Next, the first substrate 1 (as shown in part (g) of FIG. 12) on which the first conductive layer 9 and the radiation units 4 have been formed and the second substrate 2 (as shown in part (d) of FIG. 11) are aligned with each other and assembled to form a cell, such that the second conductive layer 32, the first electrode 31, and the portion 33 (as shown in FIG. 3) of the first conductive layer 9 corresponding to the first electrode 31 are connected to each other to form the waveguide cavity of the waveguide power division structure 3. Further, liquid crystal molecules are filled between the first substrate 1 and the second substrate 2, and are sealed by the sealant structure 11, thereby forming the antenna according to the present embodiment (e.g., as shown in FIGS. 1 to 3).

It should be noted that, the upper side of part (a) of FIG. 11 is a top view of the second substrate 2 in a corresponding step, and the lower side of part (a) is a cross-sectional view of the upper side of part (a) taken along a line G1-H1. The upper side of part (b) of FIG. 11 is a top view of the second substrate 2 in a corresponding step, and the lower side of part (b) is a cross-sectional view of the upper side of part (b) taken along a line G2-H2. The upper side of part (c) of FIG. 11 is a top view of the second substrate 2 in a corresponding step, and the lower side of part (c) is a cross-sectional view of the upper side of part (c) taken along a line G3-H3. The upper side of part (d) of FIG. 11 is a top view of the second substrate 2 in a corresponding step, and the lower side of part (d) is a cross-sectional view of the upper side of part (d) taken along a line G4-H4. The upper side of part (e) of FIG. 12 is a top view of the first substrate 1 in a corresponding step, and the lower side of part (e) is a cross-sectional view of the upper side of part (e) taken along a line N1-O1. The upper side of part (f) of FIG. 12 is a top view of the first substrate 1 in a corresponding step, and the lower side of part (f) is a cross-sectional view of the upper side of part (f) taken along a line N2-O2. The upper side of the part (g) of FIG. 12 is a top view of the first substrate 1 in a corresponding step, and the lower side of the part (g) is a cross-sectional view of the upper side of the part (g) taken along a line N3-O3.

It should be understood that, in addition to the above-described steps S1 to S433, the above-described manufacturing method may further include manufacturing steps corresponding to structural features of the respective components of the antenna described in the first aspect of the present disclosure, and detailed description thereof may be referred to the foregoing description.

In the antenna according to any one of the embodiments of the first aspect of the present disclosure or the antenna manufactured by the manufacturing method according to any one of the embodiments of the second aspect of the present disclosure, the power division structure of the antenna includes the waveguide power division structure and has the waveguide cavity. Thus, after a signal is input into the waveguide cavity through the input opening of the waveguide power division structure, the signal can be confined and transmitted in the waveguide cavity, thereby effectively reducing the transmission loss and the radiation loss of the signal during transmission. In addition, compared with the antenna in the related art in which a signal is input into the power division structure and then transmitted in liquid crystal, in the antenna according to any one of the embodiments of the present disclosure, the signal is input into the waveguide power division structure, and is then transmitted in the air medium within the waveguide cavity, such that the dielectric loss of the signal during transmission can be effectively reduced, and the signal loss of the antenna can be effectively reduced.

It is to be understood that the foregoing embodiments of the present disclosure may be combined with each other in a case of no explicit conflict.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and these changes and modifications also fall within the scope of the present disclosure.

What is claimed is:

1. An antenna, comprising:

a first substrate;

a second substrate opposite to the first substrate;

a plurality of radiation units on a side of the first substrate distal to the second substrate; and a waveguide power division structure between the first substrate and the second substrate, wherein the waveguide power division structure has a waveguide cavity, comprises an input opening and a plurality of output openings, and divides a signal input through the input opening into a plurality of sub-signals, the plurality of sub-signals are output from the plurality of output openings, respectively, and each of the plurality of output openings outputs one of the plurality of sub-signals to at least one of the plurality of radiation units;

wherein the antenna further comprises:

a first conductive layer on a side of the first substrate proximal to the second substrate;

a first electrode on a side of the second substrate proximal to the first substrate; and a support wall surrounding the first electrode, and a second conductive layer on an inner side of the support wall, wherein the second conductive layer, the first electrode, and a portion of the first conductive layer corresponding to the first electrode are connected to each other to form the waveguide cavity.

2. The antenna according to claim 1, wherein the first electrode has a plurality of ends corresponding to the input opening and the plurality of output openings;

the support wall comprises first portions and second portions, the first portions are portions of the support wall corresponding to the plurality of ends, and the remaining portions of the support wall are the second portions; and the first portion are on a side of the first electrode proximal to the first substrate, the second portions are on the side of the second substrate proximal to the first substrate, and the second conductive layer is only on inner sides of the second portions.

3. The antenna according to claim 1, wherein the first electrode is a T-shaped electrode, and the support wall is around the T-shaped electrode;

the second conductive layer, the T-shaped electrode, and a portion of the first conductive layer corresponding to the T-shaped electrode are connected to each other to form a T-shaped waveguide cavity;

the plurality of output openings are two output openings; and the T-shaped waveguide cavity has a first cavity and a second cavity, an extension direction of the first cavity and an extension direction of the second cavity are perpendicular to each other, two ends of the first cavity are the two output openings, one end of the second cavity is connected to a middle portion of the first cavity and communicates with the first cavity, and the other end of the second cavity is the input opening.

4. The antenna according to claim 1, further comprising: a plurality of transmission structures in one-to-one correspondence with the plurality of radiation units and on a side of the second substrate proximal to the first substrate, each of the plurality of transmission structures is connected to one of the plurality of output openings, and each transmission structure transmits the sub-signal output from the output opening connected with the transmission structure to the radiation unit corresponding to the transmission structure.

5. The antenna according to claim 4, wherein each transmission structure is a microstrip, of which one end is connected to the output opening corresponding to the transmission structure, and the other end is connected to the radiation unit corresponding to the transmission structure.

6. The antenna according to claim 4, further comprising: an impedance matching structure on the side of the second substrate proximal to the first substrate, connected between each transmission structure and the output opening corresponding to the transmission structure, and configured to match an impedance of the transmission structure to an impedance of the waveguide power division structure.

7. The antenna according to claim 6, wherein the impedance matching structure is a trapezoid electrode, a longer side of two parallel sides of the trapezoid electrode is connected to the output opening, and a shorter side of the two parallel sides of the trapezoid electrode is connected to the transmission structure corresponding to the output opening.

8. The antenna according to claim 1, further comprising:

a plurality of second electrodes in one-to-one correspondence with the plurality of radiation units and on a side of the second substrate proximal to the first substrate, and each of the plurality of second electrodes is connected to one of the plurality of output openings, wherein the first conductive layer has a plurality of slits therein, the plurality of second electrodes are in one-to-one correspondence with the plurality of slits, an orthographic projection of each slit on the second substrate and an orthographic projection of the second electrode corresponding to the slit on the second substrate have an overlapping area, and each second electrode transmits the sub-signal output from the output opening connected with the second electrode to a corresponding radiation unit through a corresponding slit.

9. The antenna according to claim 8, further comprising: a plurality of transmission structures in one-to-one correspondence with the plurality of radiation units and on the side of the second substrate proximal to the first substrate, each of the plurality of transmission structures is connected to one of the plurality of output openings, and each transmission structure is connected to a corresponding second electrode so as to transmit the sub-signal transmitted from the output opening connected with the transmission structure to the corresponding second electrode.

10. An antenna, comprising:

a first substrate;

a second substrate opposite to the first substrate;

a plurality of radiation units on a side of the first substrate distal to the second substrate; and a waveguide power division structure between the first substrate and the second substrate, wherein the waveguide power division structure has a waveguide cavity, comprises an input opening and a plurality of output openings, and divides a signal input through the input opening into a plurality of sub-signals, the plurality of sub-signals are output from the plurality of output openings, respectively, and each of the plurality of output openings outputs one of the plurality of sub-signals to at least one of the plurality of radiation units;

wherein the antenna further comprises: a dielectric layer between the first substrate and the second substrate, and a dielectric constant of the dielectric layer is changed as a strength of an electric field between the first substrate and the second substrate is changed.

11. The antenna according to claim 10, wherein the dielectric layer comprises liquid crystal molecules outside the waveguide cavity, and the waveguide cavity is filled with air.

12. The antenna according to claim 1, wherein each of the second conductive layer, the first electrode, and the portion of the first conductive layer corresponding to the first electrode has a thickness greater than 3 to 5 times a skin depth of the signal transmitted in the waveguide cavity.

13. The antenna according to claim 2, further comprising: a plurality of transmission structures in one-to-one correspondence with the plurality of radiation units and on the side of the second substrate proximal to the first substrate, each of the plurality of transmission structures is connected to one of the plurality of output openings, and each transmission structure transmits the sub-signal output from the output opening connected with the transmission structure to the radiation unit corresponding to the transmission structure.

14. The antenna according to claim 13, further comprising: an impedance matching structure on the side of the second substrate proximal to the first substrate, connected between each transmission structure and the output opening corresponding to the transmission structure, and configured to match an impedance of the transmission structure to an impedance of the waveguide power division structure.

15. The antenna according to claim 14, wherein the impedance matching structure is a trapezoid electrode, a longer side of two parallel sides of the trapezoid electrode is connected to the output opening, and a shorter side of the two parallel sides of the trapezoid electrode is connected to the transmission structure corresponding to the output opening.

16. The antenna according to claim 15, further comprising: a plurality of second electrodes in one-to-one correspondence with the plurality of radiation units and on the side of the second substrate proximal to the first substrate, and each of the plurality of second electrodes is connected to one of the plurality of output openings, wherein the first conductive layer has a plurality of slits therein, the plurality of second electrodes are in one-to-one correspondence with the plurality of slits, an orthographic projection of each slit on the second substrate and an orthographic projection of the second electrode corresponding to the slit on the second substrate have an overlapping area, and each second electrode transmits the sub-signal output from the output opening connected with the second electrode to a corresponding radiation unit through a corresponding slit.

17. The antenna according to claim 16, wherein the first electrode, each of the second electrodes, each of the transmission structures, and the impedance matching structure are in a same layer, have a one-piece structure, and comprise a same conductive material.

18. A method for manufacturing an antenna, comprising:

forming a first substrate;

forming a second substrate, and arranging the second substrate opposite to the first substrate;

forming a plurality of radiation units on a side of the first substrate distal to the second substrate; and forming a waveguide power division structure between the first substrate and the second substrate, wherein the waveguide power division structure has a waveguide cavity, comprises an input opening and a plurality of output openings, and divides a signal input through the input opening into a plurality of sub-signals, the plurality of sub-signals are output from the plurality of output openings, respectively, and each of the plurality of output openings outputs one of the plurality of sub-signals to at least one of the plurality of radiation units;

wherein the forming a waveguide power division structure comprises:

forming a first conductive layer on a side of the first substrate proximal to the second substrate;

forming a first electrode on a side of the second substrate proximal to the first substrate; and forming a support wall surrounding the first electrode and forming a second conductive layer on an inner side of the support wall, wherein the second conductive layer, the first electrode, and a portion of the first conductive layer corresponding to the first electrode are connected to each other to form the waveguide cavity.

19. The method according to claim 18, wherein the forming a support wall around the first electrode and forming a second conductive layer on an inner side of the support wall comprises:

coating a material of the support wall on the side of the second substrate proximal to the first substrate to form a support wall material layer, wherein the support wall material layer covers a side of the first electrode distal to the second substrate;

patterning the support wall material layer to form the support wall surrounding the first electrode; and forming the second conductive layer on the inner side of the support wall by a metal growth process.

* * * * *